(12) United States Patent
Morehead

(10) Patent No.: US 8,854,631 B1
(45) Date of Patent: Oct. 7, 2014

(54) FILTER DEVICE FOR HELICOPTER BLADE TRACKER

(71) Applicant: William Morehead, Chula Vista, CA (US)

(72) Inventor: William Morehead, Chula Vista, CA (US)

(73) Assignee: William J. Morehead, Chula Vista, CA (US)

( * ) Notice: Subject to any disclaimer, the term of this patent is extended or adjusted under 35 U.S.C. 154(b) by 23 days.

(21) Appl. No.: 13/901,505

(22) Filed: May 23, 2013

(51) Int. Cl.
- *G01B 11/00* (2006.01)
- *B64C 27/00* (2006.01)
- *G01S 17/66* (2006.01)
- *G02B 7/00* (2006.01)
- *G02B 5/30* (2006.01)

(52) U.S. Cl.
CPC ............... *G01S 17/66* (2013.01); *G02B 7/006* (2013.01); *G02B 5/3025* (2013.01)
USPC ................. 356/614; 73/455; 416/25; 416/61

(58) Field of Classification Search
USPC ............. 356/614–623, 23, 25, 141.2; 73/455; 416/1, 25, 61
See application file for complete search history.

(56) References Cited

U.S. PATENT DOCUMENTS

| 5,671,051 A * | 9/1997 | Wright, Jr. .................... 356/614 |
| 7,546,975 B2 * | 6/2009 | Richardson ................ 244/17.13 |
| 2002/0018716 A1 * | 2/2002 | Kennedy et al. ................ 416/25 |
| 2014/0064966 A1 * | 3/2014 | Simpkins et al. .............. 416/61 |

* cited by examiner

*Primary Examiner* — Hoa Pham
(74) *Attorney, Agent, or Firm* — Michael Shimokaji

(57) ABSTRACT

A sunlight filter device for a helicopter blade tracker includes a filter housing, a filter assembly and a mounting system. The filter housing has a first opening, a second opening and a receiving cavity formed between the first opening and the second opening. The filter assembly is mounted in the receiving cavity of the filter housing, and is adapted to block sunlight. The mounting system extends from the filter housing to securely mount the filter housing on the helicopter blade tracker.

14 Claims, 5 Drawing Sheets

FILTER DEVICE FOR HELICOPTER BLADE TRACKER

BACKGROUND OF THE INVENTION

The present invention generally relates to a filter and more particularly, to a filter device of a helicopter blade tracker.

After maintenance has been performed on a helicopter, the blades must be positioned within predetermined tolerance limits. Conventionally, the positions of the blades are determined by a helicopter blade tracker which is mounted on a fuselage of the helicopter and orients upwardly toward the underside of the blades. The helicopter blade tracker views each of the blades through a narrow window and operates on the principle that a high-flying blade remains in the field of view longer than a low flying blade.

A discrepancy of this conventional practice in determining the positions of the blades is that when the helicopter blade tracker operates in, for example, direct and bright sunlight, the accuracy of it may be substantially reduced so that the positions of the blades may not be properly tracked.

As can be seen there is a need for improving the detection of blade position in a helicopter blade tracking system.

SUMMARY OF THE INVENTION

In one aspect of the present invention, a helicopter blade tracking system comprises a helicopter blade tracker; and a sunlight filter device which comprises a hollow filter housing having a first opening, a second opening and a receiving cavity; a filter assembly mounted in the receiving cavity of the filter housing and is adapted to filter out sunlight; and a mounting system extending from the hollow filter housing to securely mount the hollow filter housing on the helicopter blade tracker, wherein the helicopter blade tracker is disposed in optical communication with the filter assembly through the second opening.

In another aspect of the present invention, a sunlight filter device for a helicopter blade tracker comprises a hollow filter housing having a first opening, a second opening, and a receiving cavity; a filter assembly mounted in the receiving cavity of the hollow filter housing and is adapted to filter out sunlight; and a mounting system extending from on the hollow filter housing to securely support the hollow filter housing on the helicopter blade tracker, wherein the helicopter blade tracker is disposed in optical communication with the filter assembly through the second opening.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Furthermore, one or more of the problems discussed above may not be fully addressed by any of the features described below.

Referring to the Figures in general, references to elements in subsequent Figures called out in previous Figures will be understood as referring back to the previous Figure(s).

As shown in FIG. 1 to FIG. 5, broadly, one embodiment of the present invention generally provides a helicopter blade tracking system 1 comprising a helicopter blade tracker 10 and a sunlight filter device 20 supported on the helicopter blade tracker 10. The helicopter blade tracker 10 is to be used on a helicopter having a fuselage and a plurality of helicopter blades (not shown). The helicopter blade tracker 10 may be mounted on the fuselage 100 and may be oriented to point toward the underside of the blades for optically determining the positions of the helicopter blades as they rotate into view.

Figure 1:
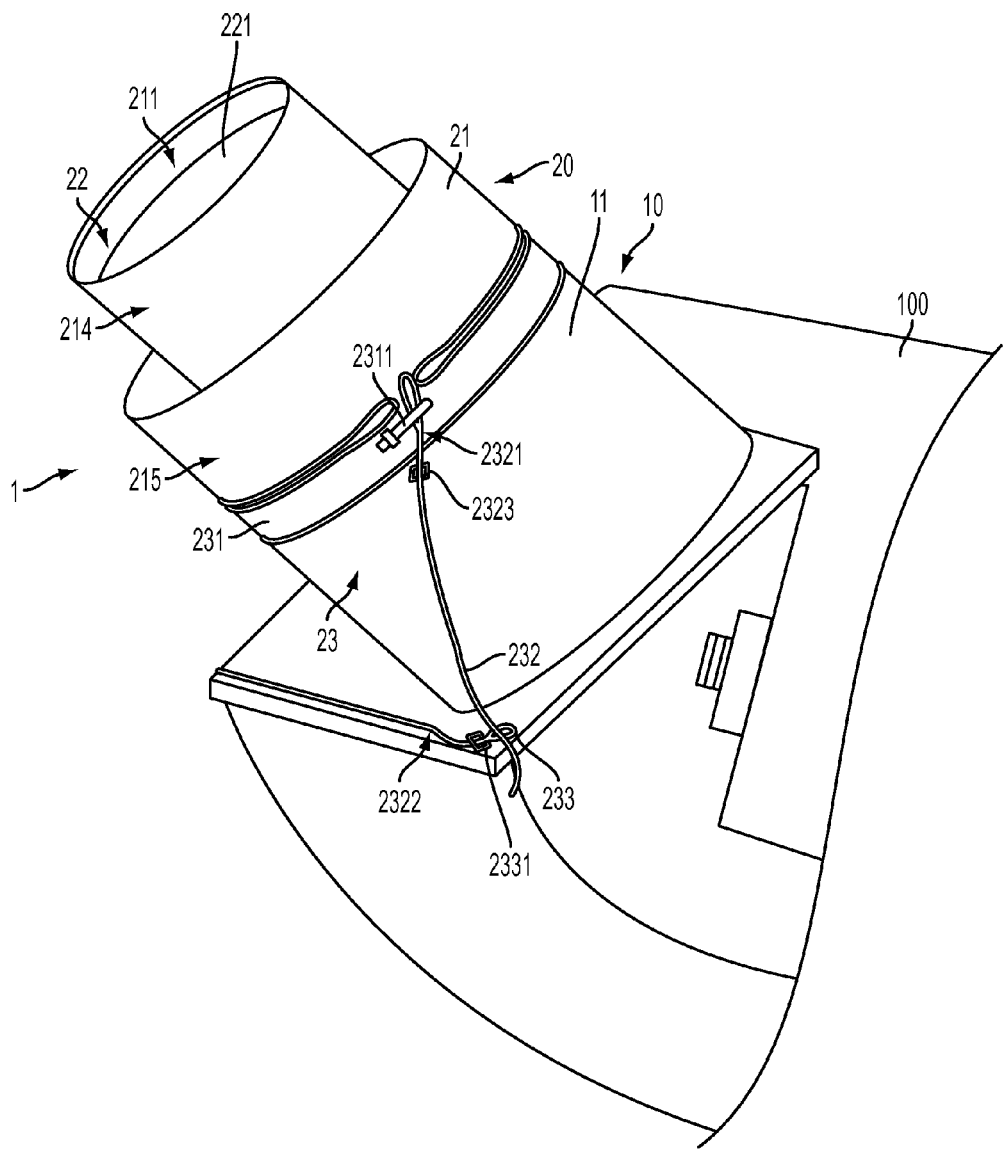
FIG. 1 is a perspective view of helicopter blade tracking system according to one embodiment of the present invention.
Figure 2:
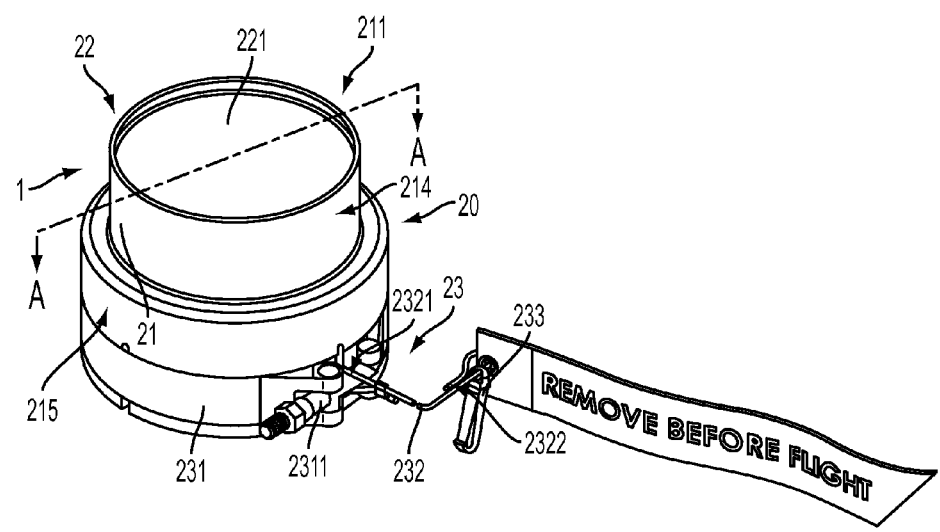
FIG. 2 is a perspective view of a sunlight filter device according to one embodiment of the present invention.
Figure 3:
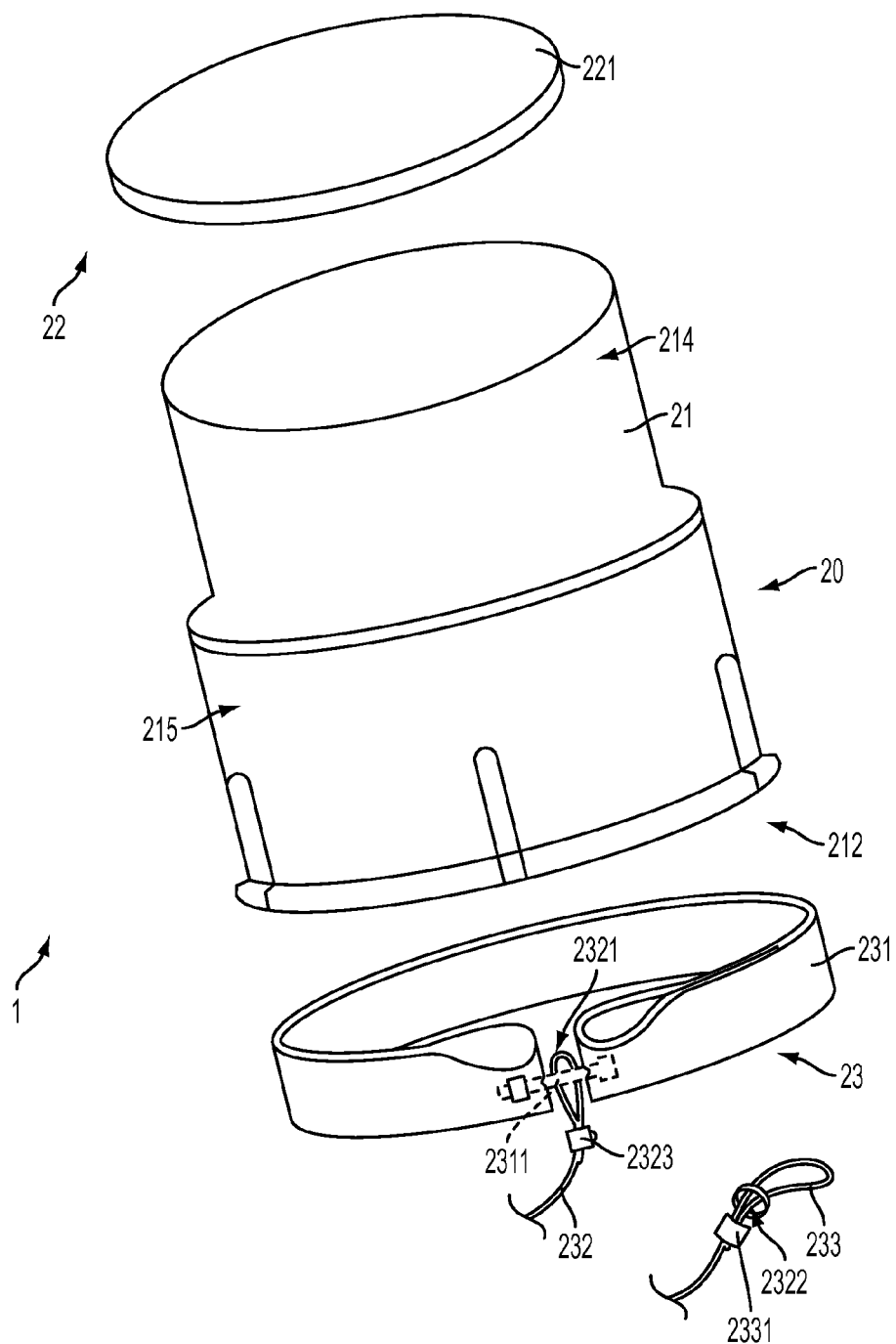
FIG. 3 is an exploded perspective view of the sunlight filter device of FIG. 2.
Figure 5:
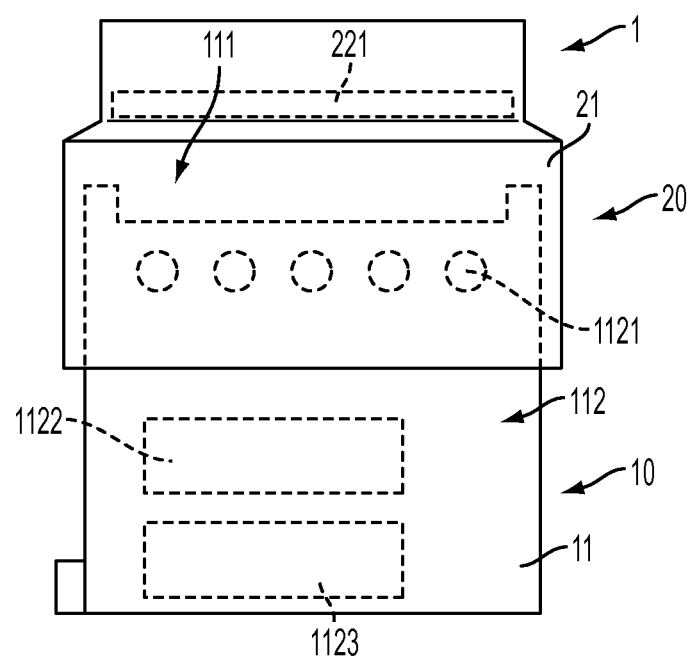
FIG. 5 is a schematic diagram of the helicopter blade tracking system of FIG. 1.

As shown in FIG. 1 and FIG. 5, the helicopter blade tracker 10 comprises a tracker housing 11 having a window 111, and an optical blade tracking module 112 mounted in the tracker housing 11. The optical blade tracking module 112 may optically detect the position of the helicopter blades via the window 111. The optical blade tracking module 112 may comprise an optical emitter 1121 a signal receiver 1122, and a processing unit 1123 electrically connected to the optical emitter 1121 and the signal receiver 1122. The optical emitter 1121 may emit optical signals propagating toward the helicopter blades. The optical signals may be reflected by the helicopter blades and are received by the signal receiver 1122. The processing unit 1123 may process the received signals and may export the signals to a signal analyzer (not shown). The signal analyzer may be loaded with a software to analyze the optical signal and determine the positions of the helicopter blades.

The sunlight filter device 20 comprises a hollow filter housing 21, a filter assembly 22, and a mounting arrangement 23.

As shown in FIG. 1 to FIG. 4, the hollow filter housing 21 of the sunlight filter device 20 may comprise a first opening 211, a second opening 212, and a receiving cavity 213 formed between the first opening 211 and the second opening 212.

The filter assembly 22 is mounted in the receiving cavity 213 of the hollow filter housing 21 and is adapted to filter out sunlight. The mounting arrangement 23 extends from the hollow filter housing 21 to securely support the hollow filter housing 21 on the helicopter blade tracker 10, in such a manner that the helicopter blade tracker 10 is configured to be in optical communication with the filter assembly 22 of the sunlight filter device 20 through the second opening 212.

The hollow filter housing 21 of the sunlight filter device 20 may have a circular cross section and have a first portion 214 and a second portion 215 downwardly extended from the first portion 214, wherein the first portion 214 has a diameter smaller than that of the second portion 215. The first opening 211 is formed on the first portion 214 while the second opening 212 is formed on the second portion 215 at a position opposite to the first opening 211. Furthermore, a diameter of the first opening 211 is smaller than that of the second opening 212.

Figure 4:
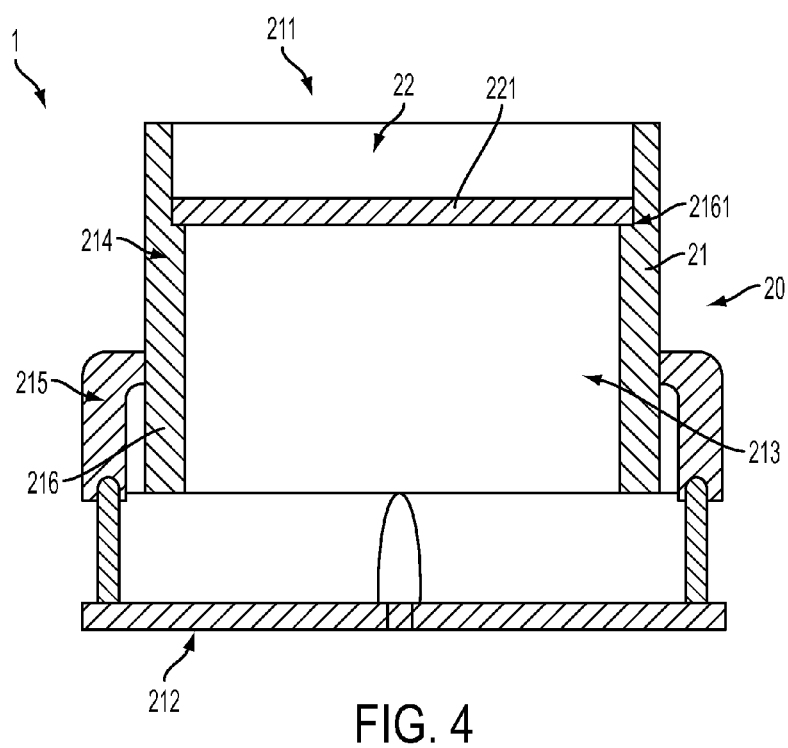
FIG. 4 is a sectional side view of the sunlight filter device of FIG. 2 along line A-A.

As shown in FIG. 4 of the drawings, the hollow filter housing 21 may further comprise retention member 216 provided in the receiving cavity 213 configured for retaining the filter assembly 22. Specifically, the retention member 216 is provided in the receiving cavity 213 and has a tubular structure extending from a sidewall of the first portion 214 to the second portion 215 of the hollow filter housing 21. The retention member 216 may define a supporting platform 2161 on its top end for supporting the filter assembly 20.

The filter assembly 22 may comprise a filter lens 221 attached on the supporting platform 2161 of the retention member 216. The filter lens 221 is disposed in the receiving cavity 213, and may be attached on the supporting platform 2161 by applying a conventional adhesive agent.

The filter lens 221 is a multi-layered lens and may comprise a polarizer lens layer which allows color and contrast enhancement, as well as reflection control. The polarizer lens layer may also be used for increasing general outdoor color saturation and contrast. Moreover, the filter lens 221 may also comprise a neutral density filter lens layer which is arranged to absorb light evenly throughout the visible spectrum.

The mounting arrangement 23 comprises a securing clamp 231 mounted on the second portion 215 of the hollow filter housing 21, a restraint cable 232 having a first end portion 2321 attached on the securing clamp 231, and a second end portion 2322 extended from the securing clamp 231, and a clipping member 233 provided on the second end portion 2322 of the restraint cable 232.

The securing clamp 231 has an elongated structure and is bent to wrap around the second portion 215 of the hollow filter housing 21. The securing clamp 231 may be configured from metallic material, such as stainless steel. The securing clamp 231 may have a securing bar 2311 which supports the first end portion 2321 of the restraint cable 232.

The restraint cable 232 may further have a first fastener 2323 provided on the first end portion 2321 for securely fastening the first end portion 2321 of the restraint cable 232 to the securing bar 2311 of the securing clamp 231. The first fastener 2323 may be configured as a ferrule such that the first end portion 2321 of the restraint cable 232 may be bent to form a loop passing around the securing bar 2311 for connecting the restraint cable 232 to the securing clamp 231.

The clipping member 233 may have a second fastener 2331 provided on the second end portion 2322 of the restraint cable configured to wrap around the helicopter blade tracker 10 or the fuselage of the helicopter and attach back to a desirable position on the restraint cable 232 in a detachable manner.

Experiments were performed to test the effectiveness of the sunlight filter device 20. The acquisition of blade position as a blade passed into view of the blade tracker 10 was measured both with and without use of the filter device 20. Measurements were taken as the number of occurrences the blade passed into view and was detected by the helicopter blade tracker 10. Under some standards, for helicopter blades to qualify as properly aligned, their detection should be in the range of 30 to 60 detections within a predetermined time. The results of the tests are shown by the number of blade cross counts detected by the helicopter blade tracker 10. A helicopter with a known calibrated blade alignment was used for each test. Table 1 below summarizes the results of blade counts detected without use of the filter device 20.

TABLE 1

| Index Blade | Blade Cross Count Number | | | | |
|---|---|---|---|---|---|
| | Test # 1 | Test # 2 | Test # 3 | Test # 4 | Test # 5 |
| 0 | 12 | 0 | 0 | 9 | 0 |
| 1 | 12 | 0 | 0 | 9 | 0 |
| 2 | 12 | 0 | 0 | 9 | 0 |
| 3 | 12 | 0 | 0 | 9 | 0 |

TABLE 1-continued

| Index Blade | Blade Cross Count Number | | | | |
|---|---|---|---|---|---|
| | Test # 1 | Test # 2 | Test # 3 | Test # 4 | Test # 5 |
| 4 | 12 | 0 | 0 | 9 | 0 |
| 5 | 12 | 0 | 0 | 9 | 0 |
| 6 | 12 | 0 | 0 | 9 | 0 |

The five tests above were carried out in direct sunlight. The results showed that the helicopter blade tracker 10 failed to accurately acquire the positioning data of the helicopter blades.

After the sunlight filter device 20 was mounted on the helicopter blade tracker 10, experiments were again carried out to test the effectiveness of the helicopter blade tracker 10 working under a similar environment. The results are summarized in Table 2 below. As shown in Table 2, the blade cross count number for all index blades is 60.

TABLE 2

| Index Blade | Blade Cross Count Number |
|---|---|
| 0 | 60 |
| 1 | 60 |
| 2 | 60 |
| 3 | 60 |
| 4 | 60 |
| 5 | 60 |
| 6 | 60 |

It should be understood, of course, that the foregoing relates to exemplary embodiments of the invention and that modifications may be made without departing from the spirit and scope of the invention as set forth in the following claims.

I claim:

1. A sunlight filter device for a helicopter blade tracker, comprising:
   a hollow filter housing having a first opening, a second opening, and a receiving cavity;
   a filter assembly mounted in the receiving cavity of the hollow filter housing adapted to filter out sunlight; and
   a mounting system provided on the hollow filter housing to securely support the hollow filter housing on the helicopter blade tracker, wherein the helicopter blade tracker is disposed in optical communication with the filter assembly.

2. The sunlight filter device as recited in claim 1, wherein the hollow filter housing has a first portion and a second portion downwardly extending from the first portion, wherein the first portion has a diameter smaller than that of the second portion, wherein the first opening is formed on the first portion while the second opening is formed on the second portion at a position opposite to the first opening.

3. The sunlight filter device as recited in claim 2, wherein the hollow filter housing further comprises a retention member provided in the receiving cavity, and has a tubular structure extending from a sidewall of the first portion to the second portion of the hollow filter housing, and defining a supporting platform on a top end of the retention member for supporting the filter assembly.

4. The sunlight filter device as recited in claim 3, wherein the filter assembly comprises a filter lens securely attached in the receiving cavity, wherein the filter lens comprises a polarizer lens layer adapted for performing color and contrast enhancement for the helicopter blade tracker.

5. The sunlight filter device as recited in claim 4, wherein the filter lens further comprises a neutral density filter lens layer adapted for absorbing visible light.

6. The sunlight filter device as recited in claim 5, wherein the mounting system comprises a securing clamp mounted on the hollow filter housing, a restraint cable having a first end portion attached on the securing clamp, and a second end portion extended from the securing clamp, and a clipping member provided on the second end portion of the restraint cable, wherein the securing clamp has a securing bar supporting the first end portion of the restraint cable.

7. The sunlight filter device as recited in claim 6, wherein the restraint cable further has a first fastener provided on the first end portion for securely fastening the first end portion of the restraint cable to the securing bar of the securing clamp, wherein the clipping member has a second fastener provided on the second end portion of the restraint cable.

8. A helicopter blade tracking system, comprising:
a helicopter blade tracker; and
a hollow filter housing having a first opening, a second opening and a receiving cavity;
a filter assembly mounted in the receiving cavity adapted to filter out sunlight; and
a mounting system extending from the hollow filter housing to securely mount the hollow filter housing on the helicopter blade tracker, wherein the helicopter blade tracker is configured to be in optical communication with the filter assembly through the second opening.

9. The helicopter blade tracking system as recited in claim 8, wherein the hollow filter housing has a first portion and a second portion downwardly extending from the first portion, wherein the first portion has a diameter smaller than that of the second portion, wherein the first opening is formed on the first portion while the second opening is formed on the second portion at a position opposite to the first opening.

10. The helicopter blade tracking system as recited in claim 9, wherein the hollow filter housing further comprises a retention member provided in the receiving cavity, and has a tubular structure extending from a sidewall of the first portion to the second portion of the hollow filter housing, and defining a supporting platform on a top end of the retention member for supporting the filter assembly.

11. The helicopter blade tracking system as recited in claim 10, wherein the filter assembly comprises a filter lens attached on the supporting platform of the retention member, wherein the filter lens comprise a polarizer lens layer adapted for performing color and contrast enhancement for the helicopter blade tracker.

12. The helicopter blade tracking system as recited in claim 11, wherein the filter lens further comprises a neutral density filter lens layer adapted for absorbing visible light.

13. The helicopter blade tracking system as recited in claim 12, wherein the mounting system comprises a securing clamp mounted on the hollow filter housing, a restraint cable having a first end portion attached on the securing clamp, and a second end portion extended from the securing clamp, and a clipping member provided on the second end portion of the restraint cable, wherein the securing clamp has a securing bar supporting the first end portion of the restraint cable.

14. The helicopter blade tracking system as recited in claim 13, wherein the restraint cable further has a first fastener provided on the first end portion for securely fastening the first end portion of the restraint cable to the securing bar of the securing clamp, wherein the clipping member has a second fastener provided on the second end portion of the restraint cable.

\* \* \* \* \*